(12) United States Patent
Behnert et al.

(10) Patent No.: US 12,722,450 B2
(45) Date of Patent: Sep. 1, 2026

(54) THERMAL MANAGEMENT MODULE FOR A THERMAL MANAGEMENT SYSTEM

(71) Applicant: Mahle International GmbH, Stuttgart (DE)

(72) Inventors: Dominik Behnert, Leonberg (DE); Andreas Draenkow, Heimsheim (DE); Timo Feldkeller, Asperg (DE); Falk Humboldt, Schoemberg (DE); Anja Kies, Weil der Stadt (DE); Michael Schmidt, Bietigheim-Bissingen (DE)

(73) Assignee: Mahle International GmbH (DE)

( * ) Notice: Subject to any disclaimer, the term of this patent is extended or adjusted under 35 U.S.C. 154(b) by 219 days.

(21) Appl. No.: 17/954,306

(22) Filed: Sep. 27, 2022

(65) Prior Publication Data

US 2023/0102168 A1 Mar. 30, 2023

(30) Foreign Application Priority Data

Sep. 28, 2021 (DE) ......................... 102021210864.4

(51) Int. Cl.
*B60H 1/00* (2006.01)
*F25B 41/20* (2021.01)
(Continued)

(52) U.S. Cl.
CPC ......... *B60H 1/00521* (2013.01); *F25B 41/20* (2021.01); *F25B 41/40* (2021.01); *F28F 3/08* (2013.01); *B60H 2001/00107* (2013.01)

(58) Field of Classification Search
CPC ....... B60H 2001/00107; B60H 1/00521; F28F 3/08; F25B 41/20; F25B 41/40
See application file for complete search history.

(56) References Cited

U.S. PATENT DOCUMENTS 10,260,817 B2 * 4/2019 Fetzer ....................... F28F 3/08
10,994,584 B2 5/2021 Kim
(Continued)

FOREIGN PATENT DOCUMENTS

CN 110411247 A 11/2019
CN 110901347 A 3/2020
(Continued)

OTHER PUBLICATIONS

CN114562832A mt (Year: 2022).*
Chinese First Office Action dated Mar. 19, 2025 for Chinese Patent Application No. 202211185888.1.

*Primary Examiner* — Gordon A Jones
(74) *Attorney, Agent, or Firm* — Fishman Stewart PLLC

(57) ABSTRACT

A thermal management module for a thermal management system is disclosed. The thermal management module includes a first heat exchanger for flowing through by a refrigerant and by a working medium fluidically separately with respect to the refrigerant. A second heat exchanger is provided including at least a first fluid path and at least a second fluid path, separate from the first fluid path, respectively for flowing through by the refrigerant. A connecting arrangement is arranged between the first heat exchanger and the second heat exchanger. The connecting arrangement connects the first heat exchanger and the second heat exchanger to one another mechanically and fluidically, so that the refrigerant can flow between the first heat exchanger and the second heat exchanger.

20 Claims, 2 Drawing Sheets

(51) Int. Cl.
*F25B 41/40* (2021.01)
*F28F 3/08* (2006.01)

(56) References Cited

U.S. PATENT DOCUMENTS

| | | | | |
|---|---|---|---|---|
| 2010/0000708 | A1* | 1/2010 | Kiemlen | F01M 5/002 165/104.19 |
| 2014/0284034 | A1* | 9/2014 | Kadle | F28D 9/005 165/166 |
| 2015/0000869 | A1* | 1/2015 | Denoual | F28F 3/08 165/96 |
| 2016/0209129 | A1* | 7/2016 | Dietrich | F28F 3/10 |
| 2020/0318919 | A1* | 10/2020 | Tonellato | F28F 3/08 |
| 2023/0339284 | A1* | 10/2023 | Ye | B60H 1/00342 |

FOREIGN PATENT DOCUMENTS

| | | | | |
|---|---|---|---|---|
| CN | 211233423 | U | | 8/2020 |
| CN | 111811153 | A | | 10/2020 |
| CN | 114562832 | A | * | 5/2022 |

* cited by examiner

THERMAL MANAGEMENT MODULE FOR A THERMAL MANAGEMENT SYSTEM

CROSS-REFERENCE TO RELATED APPLICATION

This application claims priority to German Application No. DE 10 2021 210 864.4 filed on Sep. 28, 2021, the contents of which are hereby incorporated by reference in its entirety.

TECHNICAL FIELD

The present invention relates to a thermal management module for a thermal management system and a thermal management system with such a thermal management module.

BACKGROUND

Thermal management systems are understood to mean devices which serve to transport heat in a vehicle, in particular with an electrical energy store and an electric drive motor. In these thermal management modules, typically two or more heat exchangers are provided, which are flowed through by a refrigerant and, for this, can be arranged in a refrigerant circuit. If the refrigerant is to be transported from a first to a second heat exchanger, the fluid-tight fluidic connection which is necessary for this—often realized by tubular bodies, hoses and suchlike—between these heat exchangers proves to be technically only to be very complex and therefore expensive to realize. Moreover, the susceptibility to wear of such conventional fluidic connections is also relatively high. In particular, with an increasing operating duration, the likelihood of the occurrence of undesired leakages increases.

It is therefore an object of the present invention to create an improved embodiment for a thermal management module, in which the problem explained above is eliminated.

SUMMARY

This problem is solved according to the invention by the subject of the independent claim(s). Advantageous embodiments are the subject of the dependent claims.

Accordingly, the basic idea of the invention is to equip a thermal management module, comprising two heat exchangers for flowing through by a refrigerant, with a connecting arrangement by means of which the two heat exchangers are connected to one another both mechanically and fluidically, so that refrigerant can be transported between the two heat exchangers via the connecting arrangement.

This allows both heat exchangers to be incorporated into a refrigerant circuit, in particular of a so-called thermal management system, wherein the complex configuration of the fluidic connection, mentioned in the introduction, between the two heat exchangers, can be dispensed with as part of this refrigerant circuit, as this is already realized by means of the connecting arrangement according to the invention.

In particular, a first of the two heat exchangers can be a so-called chiller for said refrigerant circuit, in which heat can be transferred between the refrigerant and a working medium—typically a coolant. A second of the two heat exchangers can be an internal heat exchanger for said refrigerant circuit. Such an internal heat exchanger can have first fluid paths and second fluid paths which are separated fluidically with respect to the first fluid paths. The internal heat exchanger can thus be integrated at different locations into the same refrigerant circuit and can thus be flowed through by the same refrigerant.

A thermal management module according to the invention comprises a first heat exchanger for flowing through with a refrigerant and—fluidically separate with respect to the refrigerant—with a working medium. The thermal management module further comprises a second heat exchanger with first and second fluid paths for flowing through with the refrigerant, preferably in a different phase, particularly preferably in liquid and gaseous phase.

Expediently, the second heat exchanger is embodied so that a thermal connection exists between the first and second fluid paths and thus also a thermal connection exists between the refrigerant in liquid and gaseous form. In a similar manner, in the first heat exchanger a thermal connection exists between the working medium and the refrigerant. According to the invention, the thermal management module comprises a connecting arrangement which is arranged between the first and the second heat exchanger. The connecting arrangement connects the first heat exchanger and the second heat exchanger both mechanically and fluidically to one another, so that the refrigerant can flow between the two heat exchangers.

In a preferred embodiment, at least one refrigerant path for flowing through by the refrigerant is formed in the first heat exchanger. In this embodiment, at least one connecting refrigerant path, able to be flowed through by the refrigerant, is formed in the connecting arrangement, by means of which at least one refrigerant path of the first heat exchanger and/or at least a first or second fluid path of the second heat exchanger communicate fluidically with one another.

Particularly expediently, at least one of the two heat exchangers, particularly preferably the first heat exchanger, is configured as a stacked-plate heat exchanger with a plurality of stacked plates, stacked on one another along a stacking direction. In this way, refrigerant paths for flowing through by the refrigerant and medium paths for flowing through by the working medium or respectively coolant are formed. This enables a simple fluidic connection of the refrigerant paths to the at least one connecting refrigerant path of the connecting arrangement.

According to another preferred embodiment, the connecting arrangement comprises a base body which surrounds the at least one connecting refrigerant path. In this embodiment, the at least one connecting refrigerant path extends from a first body side, at which the first heat exchanger is arranged, to a second body side, lying opposite the first body side, at which the second heat exchanger is arranged. In this way, the pathway for the refrigerant can be kept small between the two heat exchangers. Moreover, a simple assembly of the two heat exchangers and of the transfer arrangement is possible. Preferably, at least a first connecting refrigerant path communicates fluidically with at least a first fluid path of the second heat exchanger, and at least a second connecting refrigerant path—fluidically separate from the first connecting refrigerant path in the connecting arrangement—communicates fluidically with at least a second fluid path of the second heat exchanger.

According to a further preferred embodiment, the at least one connecting refrigerant path is configured as an aperture extending in the base body from the first to the second body side. This variant is particularly simple to produce, so that cost advantages result for the production costs of the entire thermal management module.

According to an advantageous further development, the base body comprises a circumferential side connecting the first body side with the second body side, at which circumferential side at least one functional element of the thermal management module is arranged. This enables a particularly space-saving arrangement of one or more functional elements on the thermal management module, without the refrigerant guidance for the refrigerant through the connecting arrangement or respectively the connecting refrigerant path being impaired for this.

According to another advantageous further development, the at least one functional element is a valve arrangement for controlling the throughflow of the connecting arrangement, in particular of the connecting refrigerant path, with the refrigerant. Alternatively or additionally, in this further development the at least one functional element is a temperature sensor for determining a temperature of the refrigerant flowing through the connecting arrangement, in particular through the at least one connecting refrigerant path. Alternatively or additionally in this further development the at least one functional element is a fastening element for mounting the thermal management module, in particular in or on a thermal management system of a motor vehicle. All variants facilitate a flexible, space-saving and therefore economical supplementing of the thermal management module by various functionalities.

Particularly preferably, the connecting arrangement and the two heat exchangers can be formed in one piece. This simplifies the assembly effort when the entire thermal management module is to be installed in a thermal management system in a motor vehicle.

Particularly expediently, the material of the base body can be a metal, preferably aluminium. Alternatively thereto, a plastic can also be used. In this further development, the two heat exchangers are respectively connected in a materially bonded manner, preferably by means of a welded connection or by means of a soldered connection, to the connecting arrangement, in particular to the base body of the connecting arrangement. A permanently fluid-tight fluidic connection is thus produced between the two heat exchangers by means of the connecting arrangement.

According to another preferred embodiment, the connecting arrangement, in particular its base body, is a cast part produced by means of a casting process, or a forged part produced by means of a forging process. Such a connecting arrangement is able to be produced technically in a particularly simple manner. This applies in particular when, as mentioned above, the at least one connecting refrigerant path is to be realized as an aperture formed in the base body.

According to an advantageous further development, the first heat exchanger is a chiller. Alternatively or additionally, in this further development the second heat exchanger can be an internal heat exchanger.

The invention further relates to a thermal management system for a motor vehicle, in particular for an electric vehicle, with a thermal management module according to the invention, presented above. Thus, the previously explained advantages of the thermal management module according to the invention also apply to the thermal management system according to the invention. The thermal management system comprises a refrigerant circuit, able to be flowed through by the refrigerant, in which the first and second heat exchanger of the thermal management module are arranged. The thermal management system further comprises a media circuit, formed separately from the refrigerant circuit and able to be flowed through by the working medium, in which media circuit the first heat exchanger is arranged. Expediently, the first and second fluid paths of the second heat exchanger are arranged at different locations in the refrigerant circuit.

In the refrigerant circuit, the first fluid paths of the second heat exchanger can be arranged, downstream therefrom a (first) connecting refrigerant path of the connecting arrangement, downstream therefrom the refrigerant paths of the first heat exchanger, downstream therefrom a (second) connecting refrigerant path of the connecting arrangement and downstream therefrom the second fluid paths of the second heat exchanger.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically.

DETAILED DESCRIPTION

Figure 1:
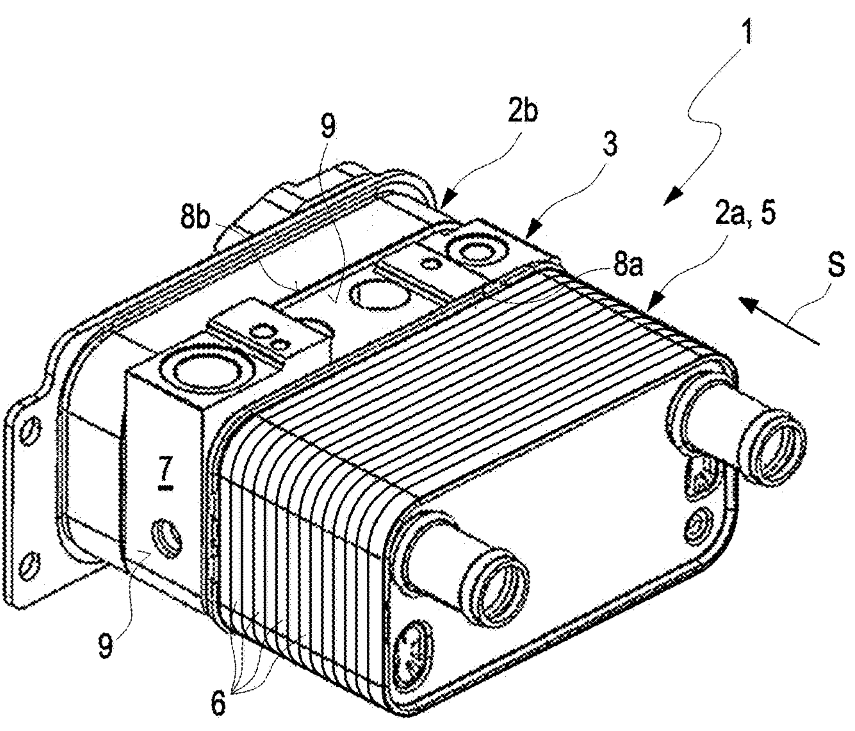
FIG. 1 an example of a thermal management module according to the invention for an electric vehicle, in perspective view, FIG. 2 the thermal management module of FIG. 1 in an exploded view, FIG. 3 an example of a thermal management system according to the invention with the thermal management module of FIG. 1.
Figure 2:
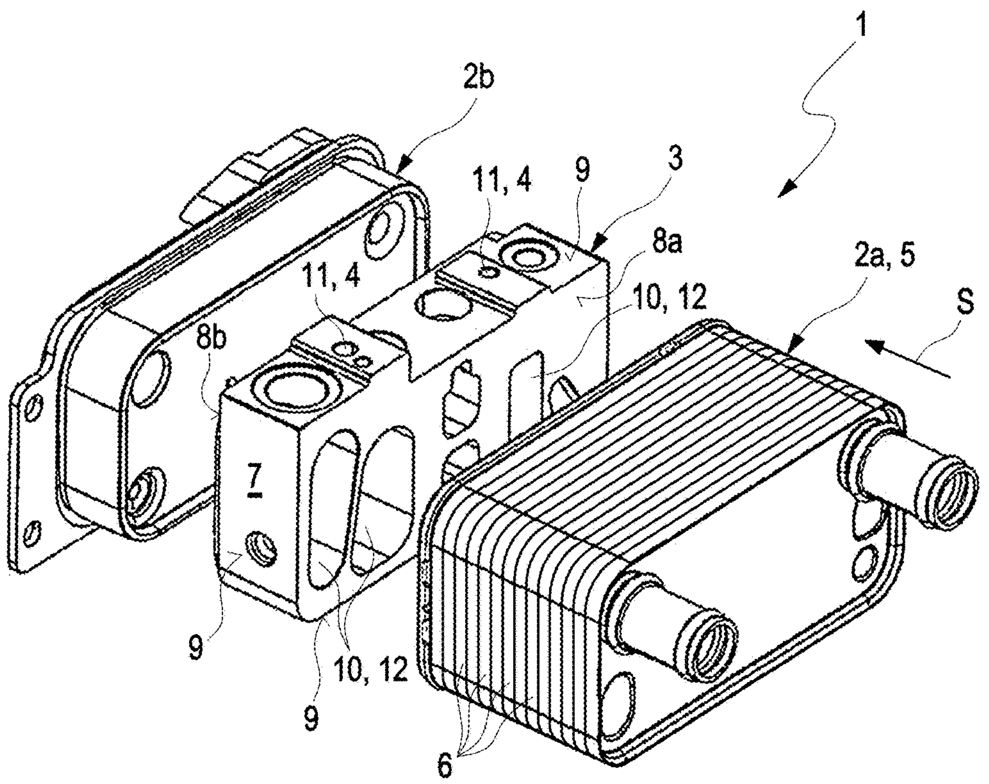

FIG. 1 illustrates an example of a thermal management module 1 according to the invention for an electric vehicle in perspective view. FIG. 2 is an exploded view of the thermal management module 1 of FIG. 1. The thermal management module 1 comprises a first heat exchanger 2*a* for flowing through by a refrigerant and—fluidically separate with respect to the refrigerant—by a working medium, for example a cooling medium. The thermal management module 1 comprises, in addition, a second heat exchanger 2*b* for flowing through by the refrigerant. For this, the second heat exchanger 2*b* has first fluid paths for flowing through by the refrigerant in liquid phase, and second fluid paths, formed fluidically separately with respect to the first fluid paths, for flowing through by the same refrigerant in gaseous phase. The first and second fluid paths can thus be integrated at various locations into a refrigerant circuit. The second heat exchanger 2*b* is therefore an internal heat exchanger.

Furthermore, the thermal management module 1 comprises a connecting arrangement 3, which is arranged between the first and the second heat exchanger 2*a*, 2*b*. The connecting arrangement 3 connects the first and the second heat exchanger 2*a*, 2*b* both mechanically and also fluidically to one another, so that the refrigerant can flow between the two heat exchangers 2*a*, 2*b*. The connecting arrangement 3 and the two heat exchangers 2*a*, 2*b* are formed in one piece.

In the first heat exchanger 2*a* a plurality of refrigerant paths (not shown) are arranged for flowing through by the refrigerant, which paths can likewise be integrated into the above-mentioned refrigerant circuit. Preferably, the refrigerant paths of the first heat exchanger downstream of the first fluid paths of the second heat exchanger 2*b* and upstream of the second fluid paths of the second heat exchanger 2*b* can be arranged in a refrigerant circuit. Fluidically separately with respect to these refrigerant paths, a plurality of media paths (not shown), through which the working medium can flow separately with respect to the refrigerant, run in the first heat exchanger 2*a*. Within the first heat exchanger 2*a* a thermal coupling of the working medium or respectively of the coolant with the refrigerant can take place, so that heat can be transferred between the refrigerant and the working medium. In the example scenario, the first heat exchanger 2*a* is configured as a stacked-plate heat exchanger 5 with a plurality of stacked plates 6 stacked on one another along a stacking direction S. By means of the stacked plates 6, refrigerant paths and media paths are alternately delimited and isolated with respect to one another fluidically.

In the connecting arrangement 3, connecting refrigerant paths 10 (cf. FIG. 2) are formed which are able to be flowed through by the refrigerant, by means of which the refrigerant paths of the first heat exchanger 2*a* communicate fluidically either with the first fluid paths or with the second fluid paths of the second heat exchanger 2*b*.

As FIGS. 1 and 2 show, the connecting arrangement 3 comprises a base body 7 which delimits the connecting refrigerant paths 10. In the example scenario, the base body 7 of the connecting arrangement 3 is a cast part. Alternatively thereto, it is conceivable to use a forged part as base body 7. According to FIGS. 1 and 2, the base body 7 has a circumferential side 9 connecting the first body side 8*a* to the second body side 8*b*. The connecting refrigerant paths 10 extend respectively within the base body 7 at a distance with respect to one another from a first body side 8*a*, on which the first heat exchanger 2*a* is arranged, to a second body side 8*b*, lying opposite the first body side 8*a*, at which the second heat exchanger 2*b* is arranged. The connecting refrigerant paths 10 can be configured respectively as an aperture 12 extending in the base body 7 from the first to the second body side 8*a*, 8*b* (cf. FIG. 2).

Functional elements 11 of the thermal management module 1 can be arranged on the circumferential side 9 of the base body 7. Such a functional element 11 can be a valve arrangement (not shown) for controlling the throughflow of the connecting refrigerant paths 10 with the refrigerant. Such a functional element 11 can also be a temperature sensor (not shown) for determining a temperature of the refrigerant flowing the connecting refrigerant paths 10. Such a functional element 11 can be, in addition, a fastening element 4 for mounting the thermal management module 1 into a thermal management system 20 for a motor vehicle.

The material of the base body 7 can be a metal, for example aluminium. The two heat exchangers 2*a*, 2*b* can be respectively connected to the base body 7 of the connecting arrangement 3 in a materially bonded manner by means of a welded connection. Instead of a welded connection, a soldered connection is also conceivable.

Figure 3:
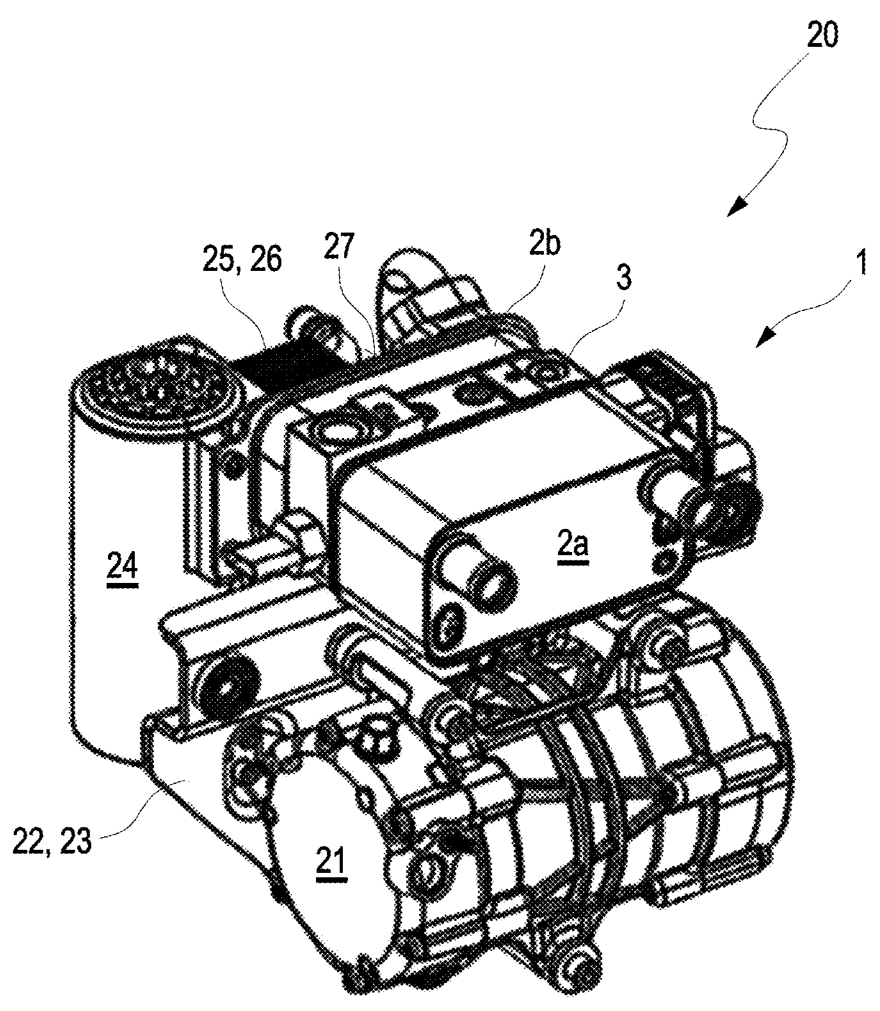

FIG. 3 shows a thermal management system 20 according to the invention with a thermal management module 1 according to the invention, as explained above. The system 20 comprises a refrigerant circuit, able to be flowed through by the refrigerant, in which the first and second heat exchanger 2*a*, 2*b* of the thermal management module 1 are arranged. The first heat exchanger 2*a* is a chiller. In the example of FIG. 3, the second heat exchanger 2*b* is an internal heat exchanger. In addition, the system 20 comprises a media circuit, formed separately from the refrigerant circuit and able to be flowed through by the first working medium—fluidically separately with respect to the refrigerant—, in which media circuit the first heat exchanger 2*a* is arranged.

In the refrigerant circuit, the first fluid paths of the second heat exchanger 2*b* can be arranged, downstream therefrom a (first) connecting refrigerant path 10 of the connecting arrangement 3, downstream therefrom the refrigerant paths of the first heat exchanger 2*a*, downstream therefrom a (second) connecting refrigerant path 10 of the connecting arrangement 3 and downstream therefrom the second fluid paths of the second heat exchanger 2*b*.

As FIG. 3 illustrates, the thermal management system 20 comprises, in addition to the components of the thermal management module 1 already explained with the aid of FIGS. 1 and 2, therefore the first heat exchanger 2*a*, the second heat exchanger 2*b* and the connecting arrangement 3, in addition a compressor 21, also arranged in the refrigerant circuit, which is fastened on the connecting arrangement 3 of the thermal management module 1 via a holding arrangement 22—in the example of FIG. 3 a type of holding clamp 23. A drier 24 can be arranged on the second heat exchanger 2*b*. Likewise, on a side 27 of the second heat exchanger 2*a*, facing away from the connecting arrangement 3, as shown an indirect heat exchanger 25 can be arranged. The heat exchanger 25 can function as a condenser 26 and can also be incorporated into the refrigerant circuit of the thermal management system 20.

The invention claimed is:

1. A thermal management module for a thermal management system, comprising:

a first heat exchanger for flowing through by a refrigerant and, fluidically separately with respect to the refrigerant, by a working medium, a second heat exchanger including at least a first fluid path and at least a second fluid path, separate from the first fluid path, respectively for flowing through by the refrigerant, a connecting arrangement arranged between the first heat exchanger and the second heat exchanger in a stacking direction, the connecting arrangement structured and arranged to connect the first heat exchanger and the second heat exchanger to one another mechanically and fluidically, so that the refrigerant can flow between the first heat exchanger and the second heat exchanger, wherein the connecting arrangement includes a base body with a first body side, on which the first heat exchanger is arranged, and a second body side lying opposite the first body side with respect to the stacking direction, in which the second heat exchanger is arranged, wherein the first heat exchanger is arranged directly on and in contact with the first body side and the second heat exchanger is arranged directly on and in contact with the second body side, wherein the connecting arrangement further includes at least one connecting refrigerant path extending entirely within the base body from the first body side to the second body side for fluidically communicating the refrigerant between the first heat exchanger and the second heat exchanger, and wherein the at least one connecting refrigerant path is structured as an aperture with an opening on the first body side and on the second body side, and wherein the aperture that defines the at least one connecting refrigerant path is surrounded by the base body and extends in the stacking direction through and entirely within the base body from the opening on the first body side to the opening on the second body side.

2. The thermal management module according to claim 1, wherein:

in the first heat exchanger at least one refrigerant path is provided for flowing through with the refrigerant, the at least one connecting refrigerant path fluidically connects the at least one refrigerant path of the first heat exchanger and at least one of the first fluid path and the second fluid path of the second heat exchanger with one another.

3. The thermal management module according to claim 1, wherein at least one of the first heat exchanger and the second heat exchanger is configured as a stacked-plate heat exchanger with a plurality of stacked plates stacked on one another along the stacking direction.

4. The thermal management module according to claim 1, wherein:

the connecting arrangement further includes a second connecting refrigerant path extending within the base body at a distance from the at least one connecting refrigerant path from the first body side to the second body side, and the at least one connecting refrigerant path communicates fluidically with at least the first fluid path of the second heat exchanger and the second connecting refrigerant path, fluidically separately from the at least one connecting refrigerant path, communicates fluidically with at least the second fluid path of the second heat exchanger.

5. The thermal management module according to claim 1, wherein the base body has a circumferential side connecting the first body side to the second body side, the circumferential side extending circumferentially around the base body relative to the stacking direction, and wherein the at least one connecting refrigerant path is delimited within the circumferential side of the base body from the opening on the first body side to the opening on the second body side.

6. The thermal management module according to claim 5, further comprising at least one functional element arranged on the circumferential side, wherein at least one of:

the at least one functional element includes a valve arrangement for controlling the throughflow of the connecting arrangement with the refrigerant;

the at least one functional element includes a temperature sensor for determining a temperature of the refrigerant flowing through the connecting arrangement; and the at least one functional element includes a fastening element for mounting the thermal management module in a motor vehicle.

7. The thermal management module according to claim 1, wherein the connecting arrangement and the first heat exchanger and the second heat exchanger are formed in one piece.

8. The thermal management module according to claim 1, wherein:

a material of the base body of the connecting arrangement is a metal, and the first heat exchanger and the second heat exchanger are connected respectively in a materially bonded manner to the connecting arrangement.

9. The thermal management module according to claim 1, wherein the connecting arrangement is a cast part or a forged part.

10. The thermal management module according to claim 1, wherein at least one of:

the first heat exchanger is a chiller; and the second heat exchanger is an internal heat exchanger.

11. A thermal management system for a motor vehicle, comprising:

a thermal management module, the thermal management module including:

a first heat exchanger for flowing through by a refrigerant and by a working medium fluidically separately with respect to the refrigerant, a second heat exchanger including at least a first fluid path and at least a second fluid path, separate from the first fluid path, respectively for flowing through by the refrigerant, and a connecting arrangement arranged between the first heat exchanger and the second heat exchanger in a stacking direction, the connecting arrangement connecting the first heat exchanger and the second heat exchanger to one another mechanically and fluidically, such that the refrigerant can flow between the first heat exchanger and the second heat exchanger, wherein the connecting arrangement includes a base body with a first body side, on which the first heat exchanger is arranged, and a second body side lying opposite the first body side with respect to the stacking direction, in which the second heat exchanger is arranged, wherein the first heat exchanger is arranged directly on and in contact with the first body side and the second heat exchanger is arranged directly on and in contact with the second body side, wherein the connecting arrangement further includes at least one connecting refrigerant path extending entirely within the base body from the first body side to the second body side for fluidically communicating the refrigerant between the first heat exchanger and the second heat exchanger, wherein the at least one connecting refrigerant path is structured as an aperture with an opening on the first body side and on the second body side, and wherein the aperture that defines the at least one connecting refrigerant path is surrounded by the base body and extends in the stacking direction through and entirely within the base body from the opening on the first body side to the opening on the second body side, a refrigerant circuit, able to be flowed through by the refrigerant, in which the first heat exchanger and the second heat exchanger of the thermal management module are arranged, and a first media circuit, provided separately from the refrigerant circuit, and able to be flowed through by the working medium, in which the first heat exchanger is arranged.

12. The thermal management system according to claim 11, wherein:

in the first heat exchanger at least one refrigerant path is provided for flowing through with the refrigerant, and the at least one connecting refrigerant path fluidically connects the at least one refrigerant path of the first heat exchanger and at least one of the first fluid path and the second fluid path of the second heat exchanger with one another.

13. The thermal management system according to claim 11, wherein at least one of the first heat exchanger and the second heat exchanger is configured as a stacked-plate heat exchanger with a plurality of stacked plates arranged on one another in the stacking direction.

14. The thermal management system according to claim 11, wherein:

the base body surrounds the at least one connecting refrigerant path between the first body side and the second body side;

the base body includes a second connecting refrigerant path that extends from the first body side to the second body side;

the at least one connecting refrigerant path communicates fluidically with at least the first fluid path of the second heat exchanger, and the second connecting refrigerant path of the connecting arrangement, fluidically separately from the at least one connecting refrigerant path, communicates fluidically with the second fluid path of the second heat exchanger.

15. The thermal management system according to claim 11, wherein the base body has a circumferential side connecting the first body side to the second body side, the circumferential side extending circumferentially around the base body relative to the stacking direction, and wherein the at least one connecting refrigerant path is delimited within the circumferential side of the base body from the opening on the first body side to the opening on the second body side.

16. The thermal management system according to claim 15, further comprising at least one functional element arranged on the circumferential side, wherein at least one of:

the at least one functional element includes a valve arrangement for controlling the throughflow of the connecting arrangement with the refrigerant;

the at least one functional element includes a temperature sensor for determining a temperature of the refrigerant flowing through the connecting arrangement; and the at least one functional element includes a fastening element for mounting the thermal management module in the motor vehicle.

17. The thermal management system according to claim 15, wherein the base body is composed of aluminium.

18. The thermal management system according to claim 11, wherein at least one of:

the first heat exchanger is a chiller; and the second heat exchanger is an internal heat exchanger.

19. A thermal management module for a thermal management system, comprising:

a first heat exchanger for flowing through by a refrigerant and, fluidically separately with respect to the refrigerant, by a working medium, a second heat exchanger including at least a first fluid path and at least a second fluid path, separate from the first fluid path, respectively for flowing through by the refrigerant, a connecting arrangement arranged between the first heat exchanger and the second heat exchanger in a stacking direction, the connecting arrangement structured and arranged to connect the first heat exchanger and the second heat exchanger to one another mechanically and fluidically via one or more connecting refrigerant paths, so that the refrigerant can flow between the first heat exchanger and the second heat exchanger, wherein the connecting arrangement includes a base body with a first body side, on which the first heat exchanger is arranged, and a second body side lying opposite the first body side with respect to the stacking direction, in which the second heat exchanger is arranged, wherein the first heat exchanger is arranged directly on and in contact with the first body side and the second heat exchanger is arranged directly on and in contact with the second body side, and wherein all connecting refrigerant paths of the one or more connecting refrigerant paths for fluidically communicating refrigerant between the first heat exchanger on the first body side and the second heat exchanger on the second body side are arranged within the connecting arrangement and surrounded by the base body.

20. The thermal management module according to claim 19, wherein said all connecting refrigerant paths include a first connecting refrigerant path structured as an aperture with an opening on the first body side and on the second body side, and wherein the aperture that defines the first connecting refrigerant path extends in the stacking direction through and entirely within the base body from the opening on the first body side to the opening on the second body side.

* * * * *